Sept. 25, 1923.
J. E. BLODGETT
1,468,794
GEAR CONSTRUCTION
Filed Sept. 18, 1922
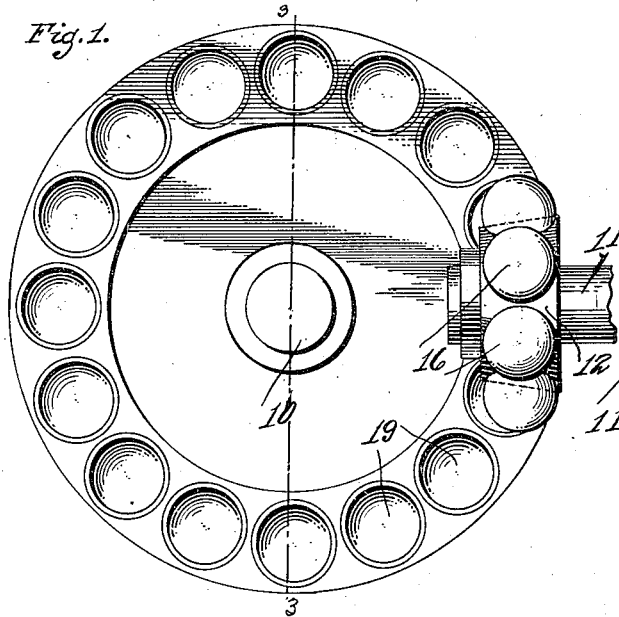
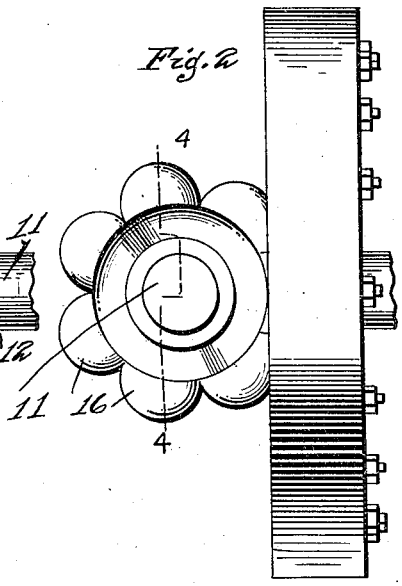
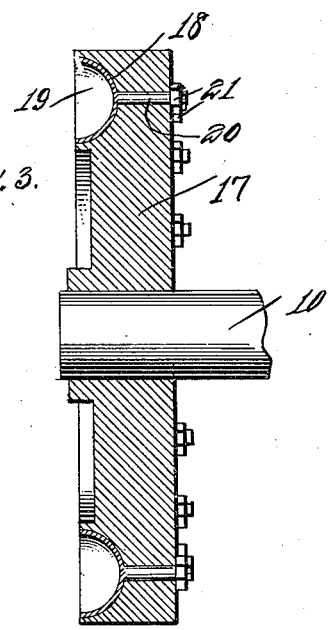
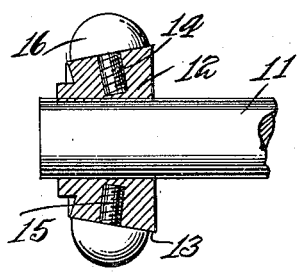
Inventor
John E. Blodgett.
Witnesses
By Richard B. Owen,
Attorney Patented Sept. 25, 1923.

1,468,794

UNITED STATES PATENT OFFICE.

JOHN E. BLODGETT, OF HOLLAND, MASSACHUSETTS.

GEAR CONSTRUCTION.

Application filed September 18, 1922. Serial No. 588,937.

*To all whom it may concern:*

Be it known that I, JOHN E. BLODGETT, a citizen of the United States, residing at Holland, in the county of Hampden and State of Massachusetts, have invented certain new and useful Improvements in Gear Constructions, of which the following is a specification.

This invention relates to gearing and has special reference to a novel gear tooth construction.

One important object of the invention is to provide an improved form of ball and socket gear tooth construction.

A second important object of the invention is to provide a novel arrangement of gear tooth and gear construction wherein the wearing parts may be made of hard steel while the remainder of the gear is made of ordinary cast iron, or the like.

A fourth important object of the invention is to provide an improved gear construction wherein the wearing parts are readily removable and replaceable.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a face view of a pair of gears constructed in accordance with this invention wherein the shafts are arranged at right angles.

Figure 2 is a view of the construction shown in Figure 1 but at right angles thereto.

Figure 3 is a section on the line 3—3 of Figure 1.

Figure 4 is a section on the line 4—4 of Figure 2.

In the embodiment of the invention herein illustrated the same has been disclosed as applied to what would ordinarily constitute a pair of bevel gears, that is to say, a pair of gears having driving and driven shafts at right angles. Under these circumstances, it will be obvious that the construction corresponds to the positions of the shafts but it will also be obvious from what follows, that the shafts may be parallel, or at other angles than right angles. In the present construction there is shown a pair of shafts 10 and 11, one of which constitutes a driving shaft and the other the driven shaft. On the shaft 11 is fixed a hub 12 having a frusto conical periphery 13 provided with a series of screw threaded openings 14 arranged perpendicularly to the periphery and radially to the axis of the shaft. Threaded into the openings 14 are the stems 15 of gear teeth, each of which has a hemispherical body 16.

On the shaft 10 is a wheel center 17 provided with annular series of hemispherical pockets 18 wherein are seated hollow hemispherical cups 19 the inner cups of which are of corresponding size to the hemisphere 16 while the outer dimensions are such as to fit the pockets 18 snugly. Each of these cups is provided with a centrally disposed radial stem 20 which extends through the gear center 17 and is threaded on its extremity to receive a nut 21 whereby the hemispherical pocket linings 19 may be drawn tightly into position in the pockets.

It is intended that the gear center 17 shall be made of some ordinary material and the hub 12 of the same material while the pocket linings 19 and hemispheres 16 are to be made of high grade tool steel or the like, or, where it is desired to eliminate friction, the pockets may be made of some bearing metal as for instance, a bearing bronze. It will be noted that in the case of undue wear on any part, it is a simple matter to remove and replace that part, and that the gears thus formed are, for the same number of teeth, much stronger than the ordinary bevel gears having teeth of the same length.

There has thus been provided a simple and efficient device of the kind described and for the purpose specified.

Having thus described the invention what is claimed as new, is:—

1. The combination with a gear having hemispherical projections constituting teeth, of a second gear having a series of spaced hemispherical recesses, and hollow hemispherical linings fitting in said recesses and receiving said teeth.

2. The combination with a gear having a hub and removable hemispherical bosses arranged in circular series on the hub and constituting gear teeth; of a second gear having a circular series of recesses and removable linings fitted in said recesses and having hollow hemispherical interiors receiving said teeth.

3. The combination with a gear center having a series of hemispherical pockets, said center being further provided with openings each extending from the bottom of one of said pockets through the peripheral portion of the center, hollow hemispherical linings fitted in said pockets and provided with stems, each stem extending through a respective opening, and nuts on said stems removably holding said linings in said pockets.

In testimony whereof I affix my signature in presence of two witnesses.

JOHN E. BLODGETT.

Witnesses:
  ARTHUR F. BLODGETT,
  THEODORE E. BLODGETT.